(12) United States Patent
Koneru

(10) Patent No.: US 7,587,475 B2
(45) Date of Patent: Sep. 8, 2009

(54) SYSTEM FOR JOINING A CLUSTER BY CLONING CONFIGURATION

(75) Inventor: Srikanth Koneru, Santa Clara, CA (US)

(73) Assignee: Nokia Siemens Networks Oy, Espoo (FI)

( * ) Notice: Subject to any disclaimer, the term of this patent is extended or adjusted under 35 U.S.C. 154(b) by 224 days.

(21) Appl. No.: 10/607,368

(22) Filed: Jun. 25, 2003

(65) Prior Publication Data

US 2004/0267913 A1 Dec. 30, 2004

(51) Int. Cl.
*G06F 15/177* (2006.01)

(52) U.S. Cl. .................. 709/221; 709/223; 709/220; 709/226; 370/254

(58) Field of Classification Search ......... 709/220–222, 709/249, 229, 226, 203, 223; 707/10, 100; 713/2; 702/186; 370/216, 254
See application file for complete search history.

(56) References Cited

U.S. PATENT DOCUMENTS

| 6,014,669 | A | * | 1/2000 | Slaughter et al. | 707/10 |
| 6,092,213 | A | * | 7/2000 | Lennie et al. | 714/3 |
| 6,748,429 | B1 | * | 6/2004 | Talluri et al. | 709/221 |
| 6,769,008 | B1 | * | 7/2004 | Kumar et al. | 709/201 |
| 6,801,937 | B1 | * | 10/2004 | Novaes et al. | 709/220 |
| 6,847,993 | B1 | * | 1/2005 | Novaes et al. | 709/221 |
| 2002/0042693 | A1 | * | 4/2002 | Kampe et al. | 702/186 |
| 2002/0161869 | A1 | * | 10/2002 | Griffin et al. | 709/221 |
| 2002/0161889 | A1 | * | 10/2002 | Gamache et al. | 709/226 |
| 2003/0056013 | A1 | * | 3/2003 | Laschkewitsch et al. | 709/249 |
| 2003/0204509 | A1 | * | 10/2003 | Dinker et al. | 707/100 |
| 2004/0221149 | A1 | * | 11/2004 | Rao et al. | 713/2 |

OTHER PUBLICATIONS

Notification Concerning Transmittal of International Preliminary Report on Patentability (Chapter I of the Patent Cooperation Treaty) dated Mar. 2, 2006, 7 pages.

* cited by examiner

*Primary Examiner*—Jungwon Chang
(74) *Attorney, Agent, or Firm*—Squire, Sanders & Dempsey

(57) ABSTRACT

The present invention clones configuration information onto a device joining a cluster. A Configuration Acquisition System (CAS) component, which, using a list of attributes to be cloned, connects to a cluster member, interacts with the cluster member to retrieve all the attributes, reconciles the values of the attributes from the cluster member with the values of the attributes in its own configuration and applies the reconciled configuration to its Configuration Subsystem.

12 Claims, 8 Drawing Sheets

SYSTEM FOR JOINING A CLUSTER BY CLONING CONFIGURATION

BACKGROUND OF THE INVENTION

Equipment that provides a high degree of reliability is a prime consideration of organizations that supply Internet and Intranet services. To help meet this need, technology has become available to combine several devices into a cluster that is configured to act as a single device. Using the cluster arrangement, it is intended that the failure of one device does not significantly affect the remaining components within the cluster.

Clusters may be configured to provide many services. For example, clusters are configured to perform traffic management, Domain Name System services, user authentication, authorization and accounting (AAA) services and collection of operational statistics. These types of services are generally known as Network Management (NM) services. The process of configuring these Network Management services within the cluster is known as Cluster Management. The act of a new device becoming part of a cluster is called 'joining'.

In a typical single-device system, the operation of the NM services is governed by a set of attributes known as the NM configuration. The Network Management system allows the viewing of the configuration and monitored data and manipulation of the configuration in several ways, including through a Graphical User Interface (GUI), a Command Line Interface (CLI) and via the Simple Network Management Protocol (SNMP). Configuring the devices within the cluster is difficult and error prone.

One problem is that it is difficult to maintain identical configurations of the Network Management features on all devices within the cluster. In addition, errors in the configuration of one device, or incompatible configurations among the devices, may render a particular NM feature inoperable.

Manually configuring cluster attributes for a new cluster member is difficult and error prone. It is also difficult to manually determine and apply which NM attributes of a cluster member should be cloned on a new member. Additionally, it is difficult to apply NM attributes of the cluster each time a new device joins a cluster.

SUMMARY OF THE INVENTION

The present invention is directed at cloning configuration information onto a device joining a cluster.

According to one aspect of the invention, a Configuration Acquisition System (CAS) component, which, using a list of attributes to be cloned, connects to a cluster member, interacts with the cluster member to retrieve all the attributes, reconciles the values of the attributes from the cluster member with the values of the attributes in its own configuration and applies the reconciled configuration to its Configuration Subsystem.

According to another aspect of the invention, different events can trigger the cloning process. For example, whenever a device joins the cluster it may be cloned. Other events that trigger can include, but not limited too, rebooting a device, reconnection of the device to the cluster, a user action, and the like. Cloning helps to ensure that the device has an up-to-date configuration with other cluster members.

According to yet another aspect, the device that joins a cluster inherits some of the clustering attributes of other members of the cluster, as well as all the attributes of the Network Management services. This helps to ensure that the new member can become a fully operational member of the cluster.

DETAILED DESCRIPTION OF THE PREFERRED EMBODIMENT

Figure 1:
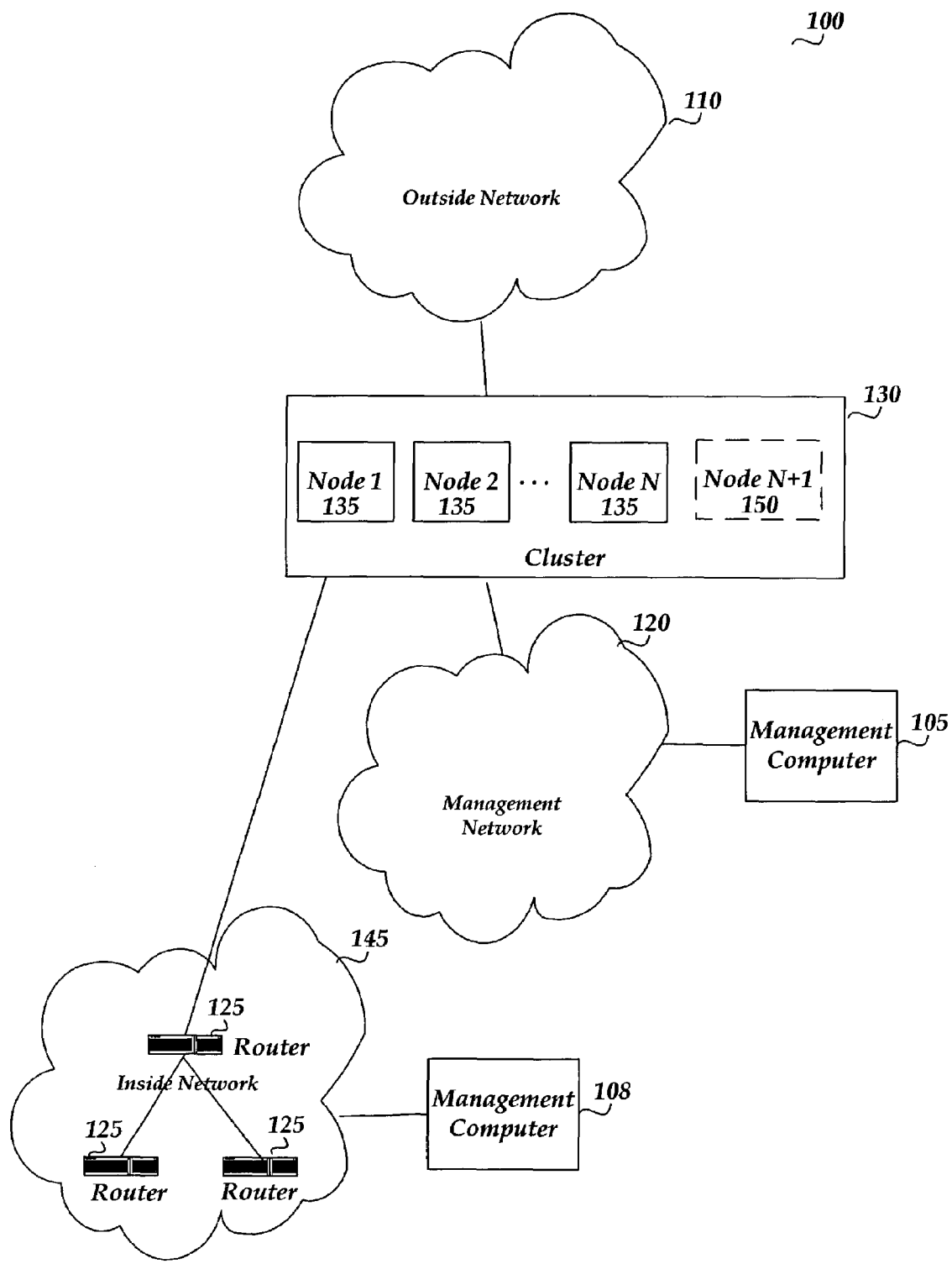
FIG. 1 illustrates an exemplary configuration cloning environment.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term 'cloning' means duplication of some or all attributes of one device by another. According to one embodiment, cloning duplicates attributes that are 'device-independent', i.e. have no parts that are unique to the system from which the attributes are duplicated.

The term "IP" means any type of Internet Protocol. The term "node" means a device that implements IP. The term "router" means a node that forwards IP packets not explicitly addressed to itself. The term "routable address" means an identifier for an interface such that a packet is sent to the interface identified by that address. The term "link" means a communication facility or medium over which nodes can communicate. The term "cluster" refers to a group of nodes configured to act as a single node.

The following abbreviations are used throughout the specification and claims: CAS=Configuration Acquisition System; CS=Configuration Subsystem; CLI=Command Line Interface; CM=Cluster Management; GUI=Graphical User Interface; MAC=Message Authentication Code; and NM=Network Management.

Referring to the drawings, like numbers indicate like parts throughout the views. Additionally, a reference to the singular includes a reference to the plural unless otherwise stated or is inconsistent with the disclosure herein.

FIG. 1 illustrates an exemplary configuration cloning environment, in accordance with aspects of the invention. As shown in the figure, cloning environment 100 includes management computers 105 and 108, cluster 130, outside network 110, management network 120, routers 125, and inside network 145. Cluster 130 includes nodes 135 that are arranged to act as a single node. Node 150 is a node desiring to join the cluster. The networks may be wired or wireless networks that are coupled to wired or wireless devices.

The present invention is directed at cloning the configuration of the cluster onto a device (such as node 150) when it joins the cluster. Cloning the configuration information of the cluster onto the joining node provides many advantages. The list of attributes within the system that performs the cloning is encapsulated helping to ensure that no attributes are missed and all desired attributes are cloned onto the node. Cloning can occur even when access to the device from a remote workstation is not available. Attributes on the local device joining the cluster may be removed from the device when they do not exist in the member configuration of the cluster. Once the configuration of the cluster has been cloned successfully, node 150 becomes a part of cluster 130.

As illustrated, inside network 145 is an IP packet based backbone network that includes routers, such as routers 125 to connect the support nodes in the network. Routers are intermediary devices on a communications network that expedite message delivery. On a single network linking many computers through a mesh of possible connections, a router receives transmitted messages and forwards them to their correct destinations over available routes. On an interconnected set of LANs, including those based on differing architectures and protocols, a router acts as a link between LANs, enabling messages to be sent from one to another. Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links.

Management computer 105 is coupled to management network 120 through communication mediums. Management computer 108 is coupled to inside network 145 through communication mediums. Management computers 105 and 108 may be used to manage a cluster, such as cluster 130, as well as to trigger a cloning event.

Furthermore, computers, and other related electronic devices may be connected to network 110, network 120, and network 145. The public Internet itself may be formed from a vast number of such interconnected networks, computers, and routers. IP network 100 may include many more components than those shown in FIG. 1. However, the components shown are sufficient to disclose an illustrative embodiment for practicing the present invention.

The media used to transmit information in the communication links as described above illustrates one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
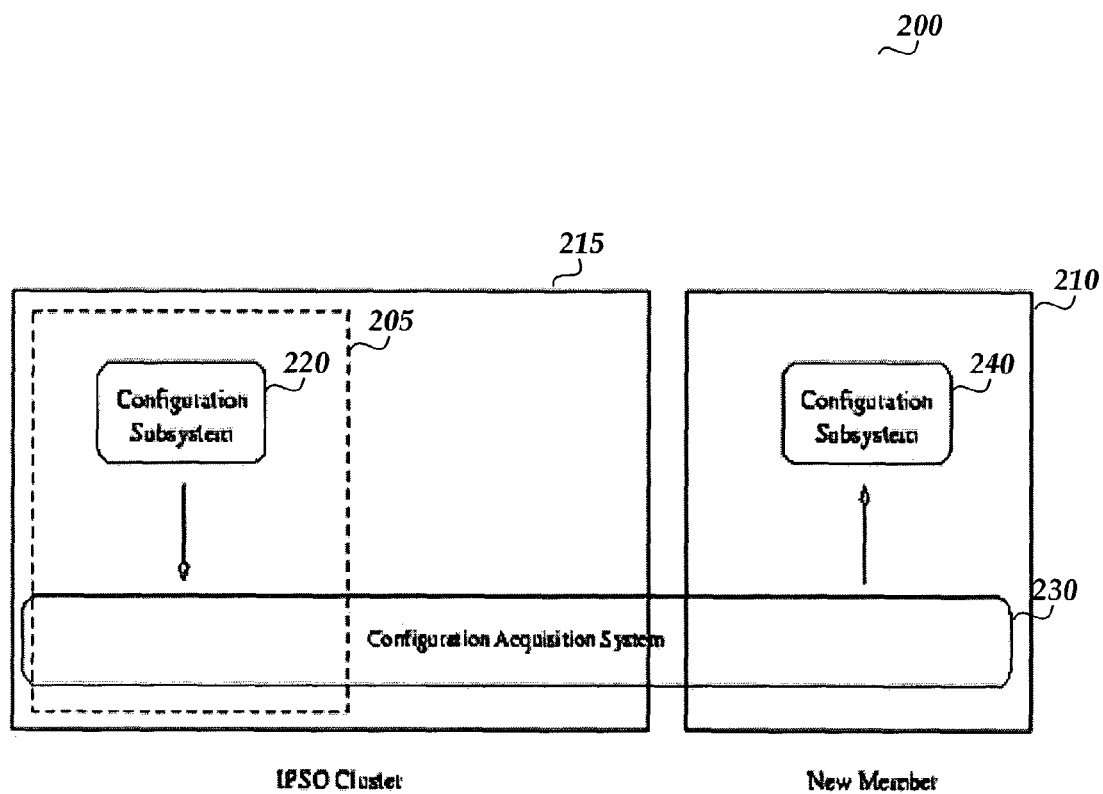
FIG. 2 illustrates an exemplary cloning system utilizing a Configuration Acquisition System.

FIG. 2 illustrates an exemplary cloning system utilizing a Configuration Acquisition System (CAS), in accordance with aspects of the invention.

New cluster member 210 uses CAS 230 to acquire the configuration information relating to the cluster. According to one embodiment, the configuration information is retrieved from one of the members of the cluster. As all of the members are configured identically, there is no need to acquire the configuration information from more than one member.

CAS 230 may maintain a list of the clustering configuration information (clustering attributes and NM attributes) that are to be cloned within a local configuration. CAS 230 is given or otherwise obtains information needed to acquire the attributes from the cluster member. According to one embodiment, the information includes the network address of the cluster member and authentication information used to access the Configuration Subsystem on the cluster member. According to one embodiment, the information to acquire the attributes from the cluster member is supplied by controls on a page from an application with Graphical User Interface (GUI) or a command in a Command Line Interface (CLI) shell.

In operation, CAS 230 connects to cluster member 205 and interacts with Configuration Subsystem 220 to retrieve all of the attributes to be cloned onto new member 210.

CAS 230 reconciles the values of the attributes from the cluster member with the values of the attributes stored within its own configuration. CAS 230 then applies the reconciled configuration to Configuration Subsystem 240 of new member 210. The cloned configuration information loaded onto the devices within the cluster may be protected so that it can not be modified. The protection may apply to one or more of the attributes on the device. This protection helps to prevent unauthorized, or unintentional, modification of the attributes that could lead to operational problems with the cluster.

According to one embodiment, the reconciliation operates on the following types of differences. When the attribute from the cluster member does not exist in the local configuration then the attribute from the cluster member does not exist in the local configuration then it is added to the local configuration.

When the attribute in the local configuration does not exist in the cluster member's configuration then this type of attribute is removed from the local configuration.

When the attribute from the cluster member exists in the local configuration, but has a different value, then this type of attribute is changed in the local configuration.

When the attribute from the cluster member exists in the local configuration and has an identical value then this type of attribute is unchanged in the local configuration.

The list of clustering attributes and Network Management attributes to be cloned from the cluster member is either built into the CAS or contained within one more Configuration Subsystem(s) (CS). According to one embodiment, the list is contained within CAS 230 to help prevent alteration of the list. For example, when the list is contained within CS 220 it could be altered by a user or other applications that maintain the CS.

According to one embodiment, a secure connection method within the CAS provides the connection between new member 210 and cluster member 205. The use of a secure connection is desirable when any of the attributes to be cloned are security-sensitive.

The system may be triggered to clone a configuration in many different ways. According to one embodiment, the following ways are used to trigger a cloning. A user action may trigger the cloning. For example, the user may select a button on a GUI, or initiate a command through a CLI. A power up, or reboot, of the device may also trigger the cloning. When a cluster member loses connection with the other members for a predetermined time may trigger a cloning to occur. For example, a cluster member may lose a network connection with the members of the cluster.

Figure 3:
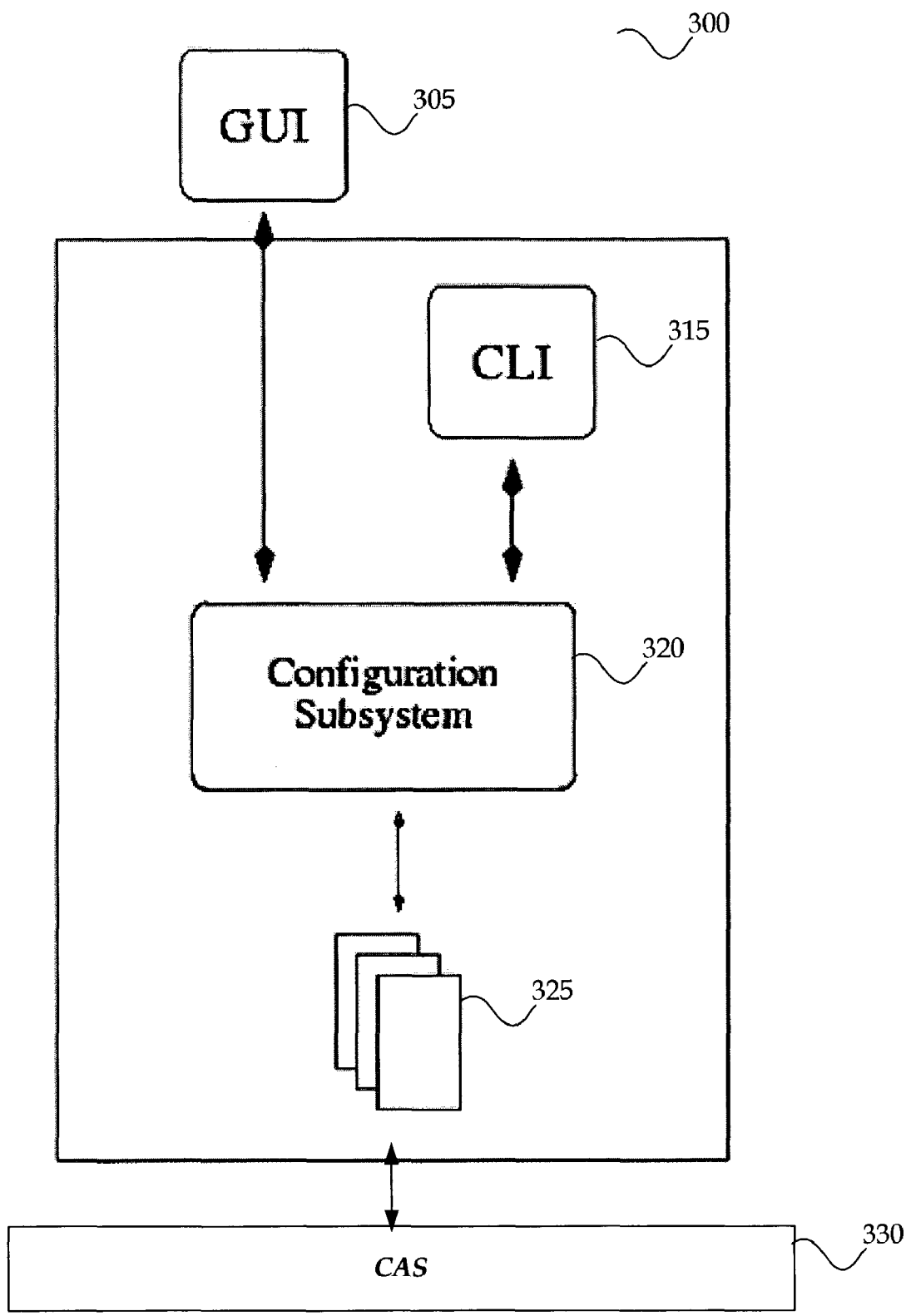
FIG. 3 illustrates an exemplary node within a cluster.

FIG. 3 illustrates an exemplary node within a cluster, in accordance with aspects of the invention. As illustrated in the figure, cluster device 300 includes GUI 305, CAS 330, CLI 315, configuration subsystem 320, and attributes 325.

According to one embodiment, GUI 305 is configured to execute on a workstation (not shown) and interact with Configuration Subsystem 320 of device 300. GUI 305 provides a graphical interface to view NM configurations and perform NM operations for device 310. CLI 315 provides a command line interface that allows the user to view NM configurations and perform NM operations on device 310 by an application executing on device 300. The GUI and CLI associated with device 300 may also be used to trigger a cloning.

CAS 330 is configured to communicate with device 300 and other devices within the cluster. CAS 330 may be included within device 300 or it may be separate from device 300. Generally, CAS 330 is used to communicate cloning information.

Figure 4:
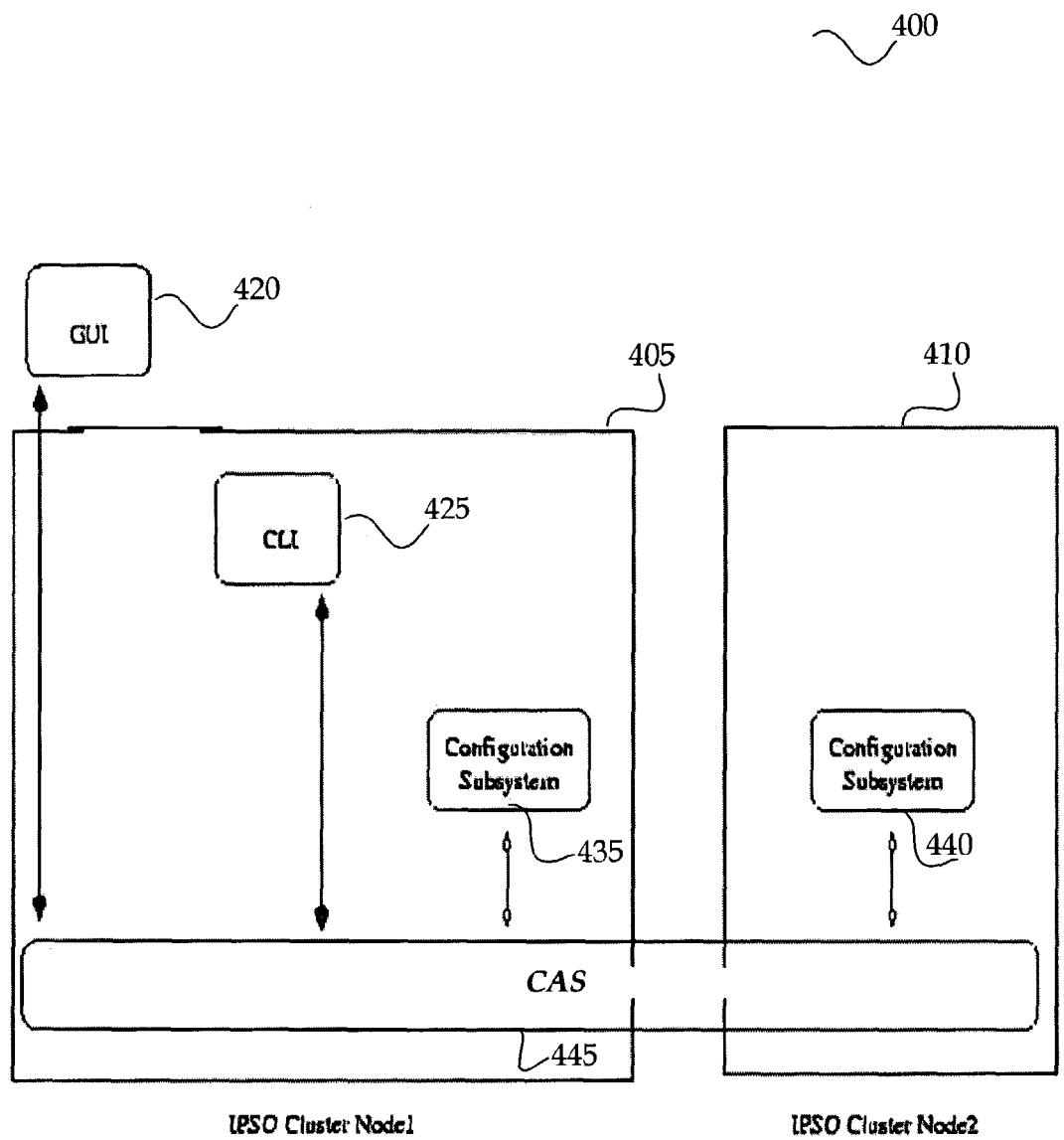
FIG. 4 shows an exemplary architecture of a cluster.

FIG. 4 shows an exemplary architecture of a cluster, in accordance with aspects of the invention. As shown in the figure, cluster 400 includes GUI 420, CLI 425, Configuration Subsystems 435 and 440, and CAS 445.

The GUI and CLI present a view of a single device and the CAS helps to ensure integrity of the NM configuration on every device within the cluster by communicating the attributes to clone. CAS 445 distributes information between the nodes within the cluster. Under the cloning system, when a device joins the cluster it is cloned to the other nodes within the cluster. According to one embodiment, when a device joins the cluster that has attributes that are not common to the cluster, those attributes may be disabled, removed, modified, left alone, and/or an error message is returned to the device. The action taken regarding the attribute depends upon the attribute that is not common. For example, if the attribute does not affect operation of the device within the cluster it could be left alone with no changes. On the other hand, when the attribute is critical to the device and it is not a common attribute the device is not allowed to join since the device would not work properly within the cluster.

According to one embodiment, the system acquires exclusive authority of the device joining the cluster until it is configured with the cloned configuration information. This helps to prevent more than one user or system from changing the configuration information of the device.

At some point before joining the cluster, a user enters information used in joining the cluster into the device. The GUI or CLI may be used to enter the cluster information. According to one embodiment of the information, the user enters an IP address associated with the cluster.

According to one embodiment, GUI 420 is implemented as a set of Web pages in a browser and a Web Server. The server may operate on a device within the cluster or a device separate from the cluster. The server may operate on all or some of the cluster members.

CLI 425 is a management CLI that presents the NM information relating to the device and the cluster textually to a user.

When a device joins the cluster, CAS 445 interacts with the configuration subsystem of the device joining the cluster to apply the cloning configuration information, thereby creating a clone device. According to one embodiment, when a change cannot be applied to a member, CAS 445 restores the original value of the attribute to the joining device and does not allow the device to join the cluster. This helps to ensure that all the members of the cluster maintain the same attributes. When a problem occurs CAS 445 may indicate that there was a failure to the GUI and CLI of the joining device, or send the error to some other location. When the cloning is complete, the newly added device operates as part of the cluster.

Figure 5:
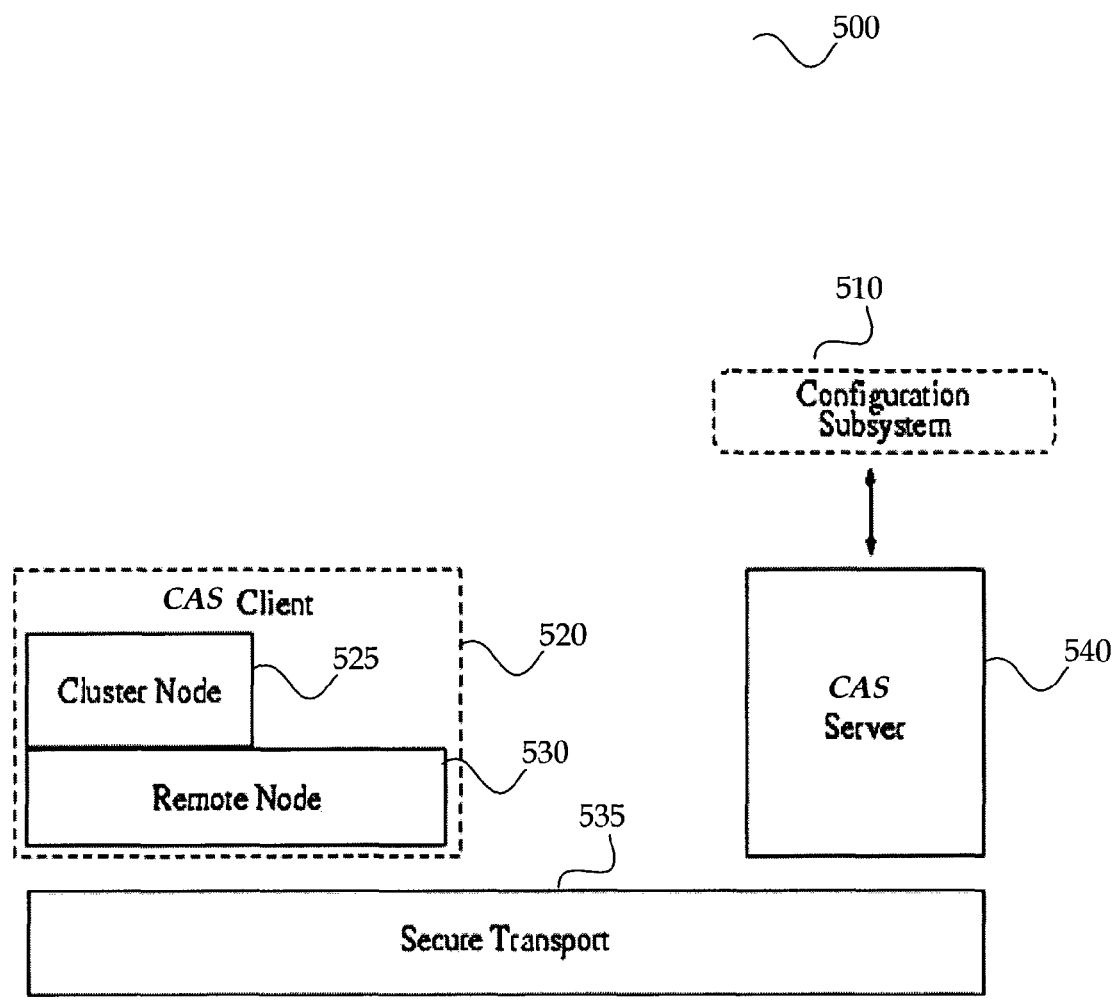
FIG. 5 illustrates components of the CAS.

FIG. 5 illustrates components of the CAS, in accordance with aspects of the invention. As illustrated in the figure, CAS 500 includes CAS Client 520, configuration subsystem 510, CAS Server 540 and secure transport 535. CAS Client 520 includes cluster node 525 and remote node 530. Cluster Node 525 maintains information about the cluster's members. Remote Node 530 maintains information about each cluster member and tracks NM operations. Secure Transport 535 delivers and receives messages to perform NM operations and performs integrity checks on the messages. CAS Server 540 is arranged to communicate with configuration subsystem 510 and communicate with CAS client 520 through secure transport 535.

Configuration Acquisition System 500 acts as the backbone for the nodes within the cluster. CAS 500 provides base mechanisms including: discovering the members within the cluster; delivering queries and operations relating to NM attributes to the devices in the cluster; ensuring message integrity; an interface for management applications; and an interface to each device's local configuration subsystem. CAS 500 also includes a secure mechanism for transporting the information in the messages sent between the nodes within the cluster.

Configuration Acquisition System 500 helps to maintain identical configurations of Network Management features on all devices in the cluster. CAS 500 is also configured to automatically query the nodes it is coupled with in order to determine the cluster members. These queries are performed periodically to help ensure that all cluster members are available at any given time and have the same cloning configuration information.

CAS Client 520 uses Cluster Node 525 to discover the cluster's member devices.

CAS 500 uses messages to perform system and NM operations. The system operations include acquiring and releasing the configuration lock. When a message is to be sent, the CAS fills in header and delivers the message. When a message is received, the CAS checks the header and accepts the message only if values in the fields of the header are valid. The CAS discards any message whose header has invalid values in the fields.

CAS Client 520 composes the body of a CAS message and uses Cluster Node 525 to deliver the message to the cluster members; receive the responses from the members; and extract the result of the operation from the message. Remote Node 530 delivers the message to a particular cluster member and checks that a response message is received for every request message sent. Secure Transport 535 is the transport mechanism that actually sends and receives the messages.

The CAS Client can be implemented as a collection of shared-object libraries with well-defined Application Programming Interfaces (APIs). GUI and CLI can use these APIs to interact with the CAS to perform NM operations.

The CAS Server can be implemented as a daemon that is launched during system start-up.

CAS's Secure Transport can be implemented as a Secure Sockets Layer (SSL) socket. This provides an extra layer of security by providing the ability to encrypt the CAS messages.

Figure 6:
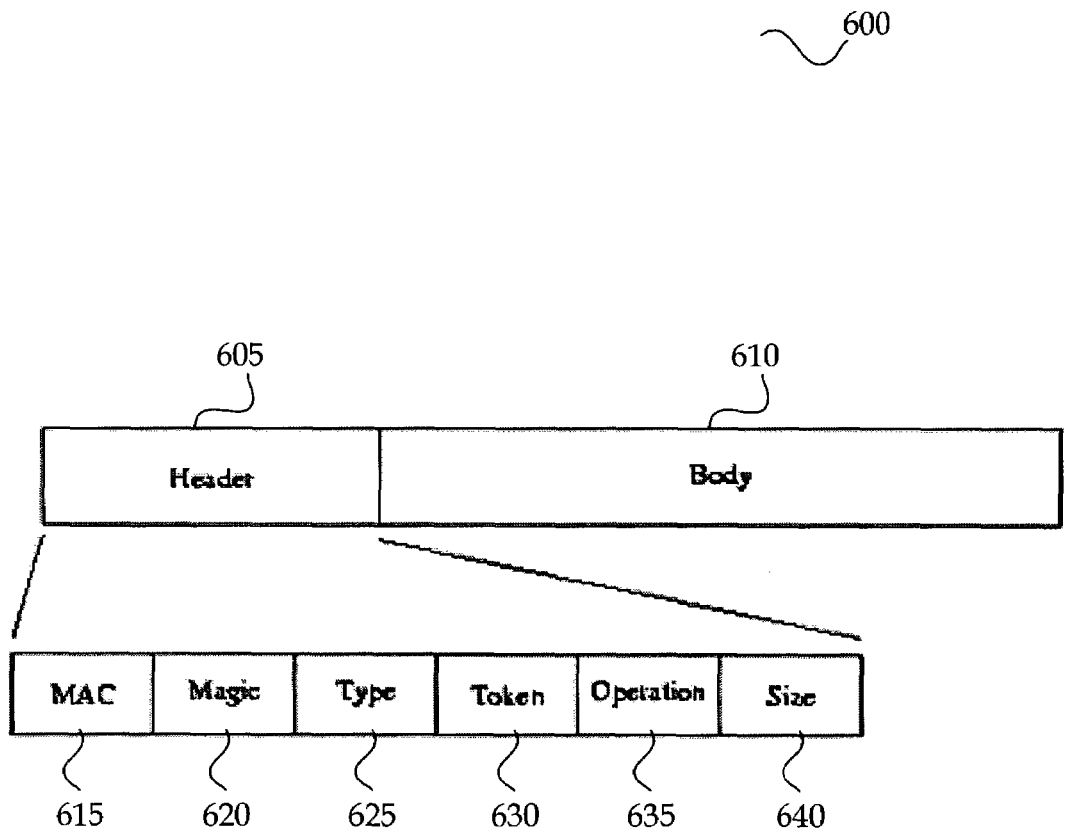
FIG. 6 shows an exemplary CAS message.

FIG. 6 shows an exemplary CAS message, in accordance with aspects of the invention. Message 600 includes header 605 and body 610. According to one embodiment of the invention, header 605 is identical for all messages, and body 610 is dependent on the type of message being sent. The header comprises the following fields:

Message Authentication Code (MAC) 615 is calculated from the message's contents and a value is provided to all members the system. The value acts as a "shared secret" between the members of the cluster.

Magic value 620 is identical for all messages and indicates that the message is a CAS message.

Type value 625 indicates the type of message. According to one embodiment of the invention, the message type includes a 'request' type and a 'response' type.

Token value 630 is unique for each request/response message and can be used by the CAS Client to track outstanding requests.

Operation 635 indicates the particular NM operation to be performed at each cluster member. According to one embodiment of the invention, the operations include an 'attribute get' operation and an 'attribute set' option.

Size value 640 contains the number of bytes in the message's body.

The MAC and Magic fields ensure the integrity of the message. MAC 615 ensures the integrity for the contents of the message (including the header). MAGIC field 620 ensures the integrity of the origin of the message (a CAS Client or Server).

Figure 7:
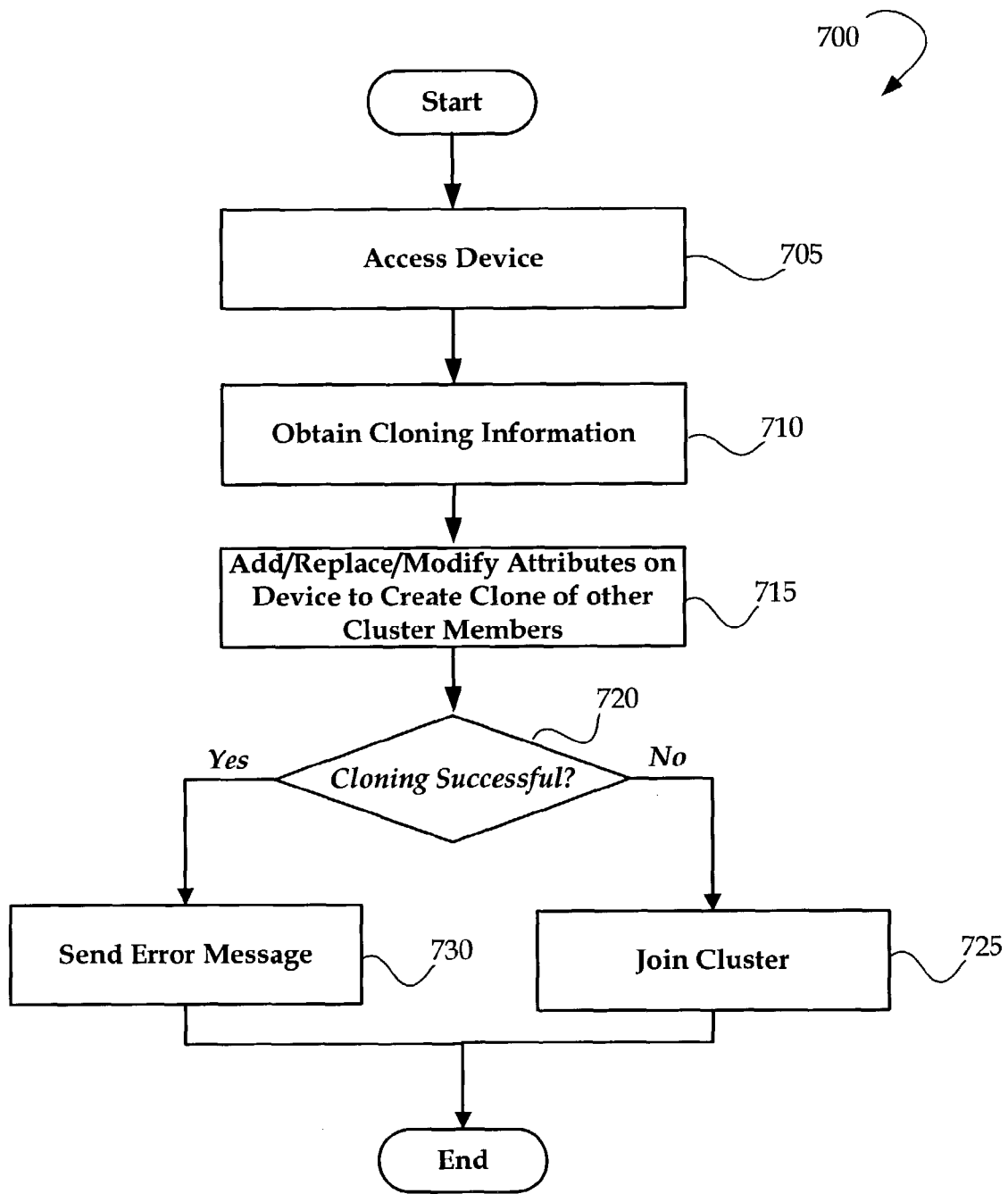
FIG. 7 illustrates a process flow for joining a cluster by cloning configuration information.

FIG. 7 illustrates a process flow for joining a cluster by cloning configuration information, in accordance with aspects of the invention. After a start block, process 700 flows to block 705 where the device desiring to join the cluster is accessed. Transitioning to block 710, cloning information is obtained to clone onto the device joining the cluster. The cloning information includes the attributes used by the devices operating within the cluster. Flowing to block 715, the clusters attributes are cloned onto the device. Cloning the device involves ensuring that the common attributes on the joining device are the same as the common attributes on the other cluster devices. The cloning may involve adding, replacing, and/or modifying attributes on the device joining the cluster. Moving to decision block 720, a determination is made as to whether the cloning was successful. When the cloning is not successful, the process moves to block 730 where an error message may be sent indicating the unsuccessful attempt. According to one embodiment, the error message is sent to the device attempting to join the cluster. When the cloning is successful, the process moves to block 725 where the device becomes a part of the cluster. The process then moves to an end block and returns to processing other actions.

Figure 8:
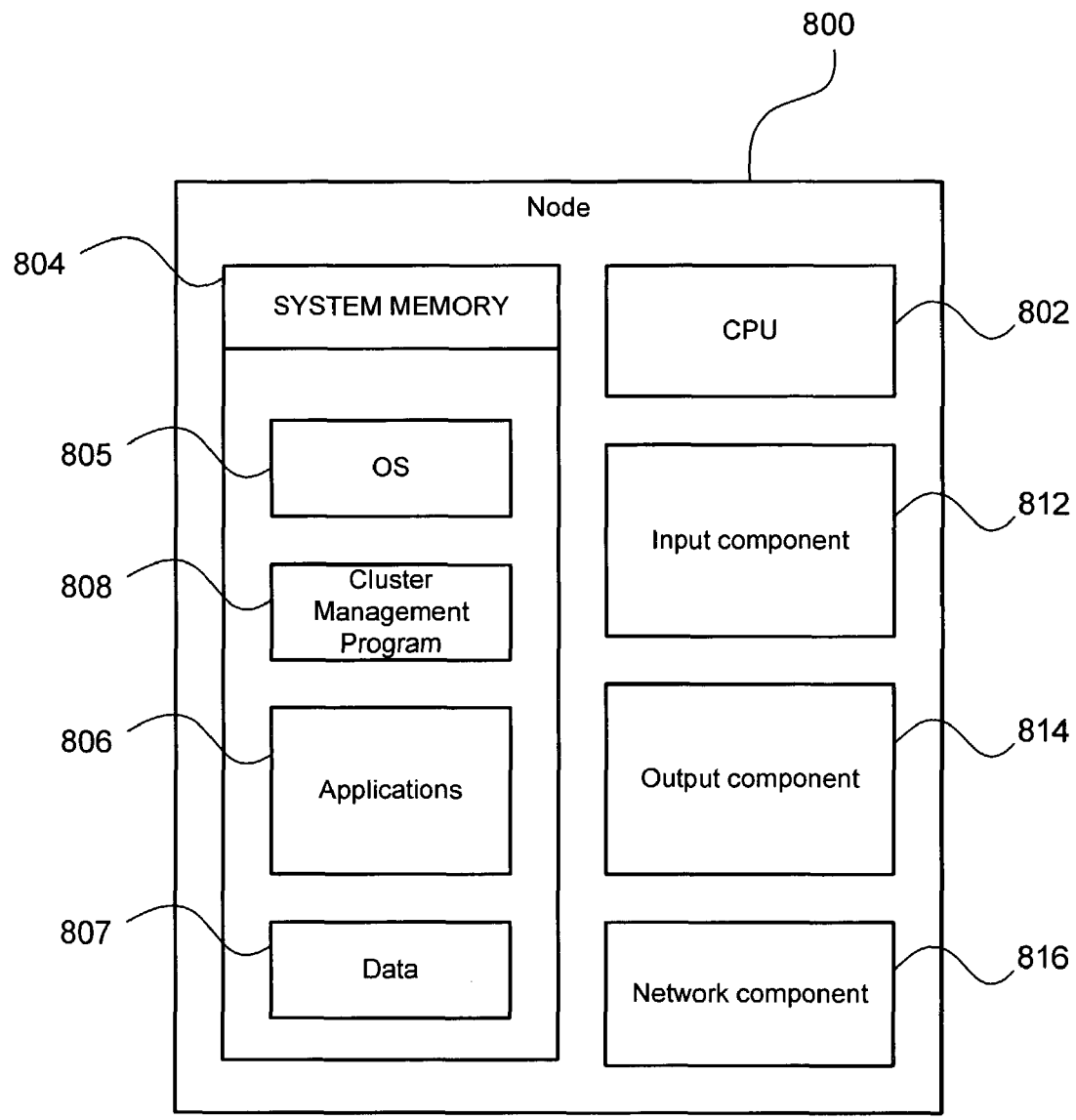
FIG. 8 illustrates an exemplary computing device that may be used, in accordance with aspects of the invention.

FIG. 8 illustrates an exemplary computing device that may be used in accordance with aspects of the invention. For illustrative purposes, node 800 is only shown with a subset of the components that are commonly found in a computing device. A computing device that is capable of working in this invention may have more, less, or different components as those shown in FIG. 8. Node 800 may include various hardware components. In a very basic configuration, Node 800 typically includes central processing unit 802, system memory 804, and network component 816.

Depending on the exact configuration and type of computing device, system memory 804 may include volatile memory, non-volatile memory, data storage devices, or the like. These examples of system memory 804 are all considered computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by node 800. Any such computer storage media may be part of node 800.

Node 800 may include input component 812 for receiving input. Input component 812 may include a keyboard, a touch screen, a mouse, or other input devices. Output component 814 may include a display, speakers, printer, and the like.

Node 800 may also includes network component 816 for communicating with other devices in an IP network. In particular, network component 816 enables node 800 to communicate with mobile nodes and corresponding nodes. Node 800 may be configured to use network component 816 to receive and send packets to and from the corresponding nodes and the mobile nodes. The communication may be wired or wireless.

Signals sent and received by network component 816 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Software components of node 800 are typically stored in system memory 604. System memory 804 typically includes an operating system 805, one or more applications 806, and data 807. As shown in the figure, system memory 804 may also include cluster management program 808. Program 808 is a component for performing operations relating to cloning as described above. Program 808 includes computer-executable instructions for performing processes relating to cluster management.

The above specification, examples and data provide a complete description of the invention. Since many embodiments of the invention can be made without departing from the spirit and scope of the invention, the invention resides in the claims hereinafter appended.

What is claimed is:

1. A method for cloning a node associated with a cluster, the method comprising:
    employing a configuration acquisition system included in the node to determine configuration information to clone from a cluster member accessed by the node by connecting to the cluster member and retrieving the configuration information from the cluster member;
    automatically cloning the configuration information onto a configuration subsystem of the node;
    reconciling the retrieved configuration information with a local configuration associated with the configuration acquisition system;
    applying the reconciled configuration information onto the node;
    determining when to trigger the cloning of the node; and
    determining when the cloning is successful and when the cloning is successful adding the node to the cluster, and when the cloning is not successful, creating an error.

2. The method of claim 1, wherein reconciling the retrieved configuration information, further comprises adding an attribute to the local configuration when it is determined that the attribute from the cluster member does not exist in the local configuration.

3. The method of claim 1, wherein reconciling the retrieved configuration information, further comprises removing an attribute from the local configuration when it is determined that the attribute in the local configuration does not exist in the cluster member's configuration.

4. The method of claim 1, wherein reconciling the retrieved configuration information, further comprises changing the local configuration when an attribute from the cluster member exists in the local configuration but has a different value.

5. The method of claim 1, wherein determining when to trigger the cloning of the node further comprises triggering the cloning on at least one of the following events:
    a joining of the node;
    a rebooting of the node;
    a reconnection of the node; and
    upon a predetermined user action.

6. A system for cloning a node associated with a cluster, the system comprising:
    a network interface configured to communicate with cluster members;
    a memory configured to store configuration information relating to the cluster;
    a configuration acquisition system included in the node and configured to distribute the configuration information to the node; and
    a processor configured to perform actions, including
    employing the configuration acquisition system to determine the configuration information to clone from a cluster member accessed by the node by connecting to the cluster member and interacting with the cluster member to retrieve the configuration information;
    automatically cloning the configuration information onto a configuration subsystem of the node;
    reconciling the retrieved configuration information with a local configuration associated with the configuration acquisition system;
    applying the reconciled configuration information onto the node;
    determining when to trigger the cloning of the node; and
    determining when the cloning is successful and when the cloning is successful adding the node to the cluster, and when the cloning is not successful, creating an error.

7. The system of claim 6, wherein reconciling the retrieved configuration information, further comprises adding an attribute to the local configuration when it is determined that the attribute from the cluster member does not exist in the local configuration.

8. The system of claim 6, wherein reconciling the retrieved configuration information, further comprises removing an attribute from the local configuration when it is determined that the attribute in the local configuration does not exist in the cluster member's configuration.

9. The system of claim 6, wherein reconciling the retrieved configuration information, further comprises changing the local configuration when an attribute from the cluster member exists in the local configuration but has a different value.

10. The system of claim 6, wherein the configuration acquisition system further comprises:
    a secure transport configured to transport messages;
    a configuration acquisition system server coupled to the secure transport; and
    a configuration acquisition system client coupled to the secure transport.

11. An apparatus for cluster management, the apparatus comprising:
    a node;
    means, included in the node, for determining configuration information to clone from a cluster member accessed by the node, the means for determining comprising means for connecting to the cluster member and means for retrieving the configuration information from the cluster member;
    means for automatically cloning the configuration information onto the node;
    means for reconciling the retrieved configuration information with a local configuration of the node;
    means for applying the reconciled configuration information onto the node;
    means for determining when to trigger the cloning of the node;
    means for determining when the cloning is successful and when the cloning is successful adding the node to the cluster, and when the cloning is not successful, creating an error.

12. An apparatus for cluster management, the apparatus comprising:
    a processor, included in a node, the processor configured to
        determine configuration information to clone from a cluster member accessed by the node, the determining comprising connecting to the cluster member and retrieving the configuration information from the cluster member;
        automatically clone the configuration information onto the node;
        reconcile the retrieved configuration information with a local configuration of the node;
        apply the reconciled configuration information onto the node;
        determine when to trigger the cloning of the node; and
        determine when the cloning is successful and when the cloning is successful adding the node to the cluster, and when the cloning is not successful, creating an error.

* * * * *